(12) United States Patent
Ikezawa et al.

(10) Patent No.: US 12,371,024 B2
(45) Date of Patent: Jul. 29, 2025

(54) VEHICLE DECELERATION ASSISTANCE APPARATUS AND METHOD, AND COMPUTER-READABLE STORAGE MEDIUM STORING VEHICLE DECELERATION ASSISTANCE PROGRAM

(71) Applicant: TOYOTA JIDOSHA KABUSHIKI KAISHA, Toyota (JP)

(72) Inventors: Yuta Ikezawa, Toyota (JP); Kohei Tochigi, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 129 days.

(21) Appl. No.: 18/332,845

(22) Filed: Jun. 12, 2023

(65) Prior Publication Data
US 2024/0075933 A1 Mar. 7, 2024

(30) Foreign Application Priority Data
Sep. 5, 2022 (JP) .................................. 2022-140831

(51) Int. Cl.
*B60W 30/18* (2012.01)

(52) U.S. Cl.
CPC .......................... *B60W 30/18159* (2020.02); *B60W 30/18154* (2013.01); *B60W 2510/30* (2013.01)

(58) Field of Classification Search
CPC ..... B60W 30/18159; B60W 30/18154; B60W 2510/30; B60W 2552/53; B60W 30/18009; B60W 10/04; B60W 10/18; B60W 30/18145; B60W 50/14; B60W 2050/143; B60W 2050/146; B60W 2420/54; B60W 2520/12; B60W 2520/28; B60W 2540/18
See application file for complete search history.

(56) References Cited

U.S. PATENT DOCUMENTS

| | | | |
|---|---|---|---|
| 8,355,851 | B2 | 1/2013 | Inoue et al. |
| 8,370,040 | B2 | 2/2013 | Inoue et al. |
| 8,417,430 | B2 | 4/2013 | Saeki |
| 8,548,709 | B2 | 10/2013 | Morita |
| 8,768,597 | B2 | 7/2014 | Kagawa |
| 9,174,643 | B2 | 11/2015 | Aso |
| 10,017,178 | B2 | 7/2018 | Morimoto et al. |

(Continued)

FOREIGN PATENT DOCUMENTS

JP 2020-004333 A 1/2020

*Primary Examiner* — Brian P Sweeney
(74) *Attorney, Agent, or Firm* — Sughrue Mion, PLLC

(57) ABSTRACT

A vehicle deceleration assistance apparatus executes a deceleration assistance control to assist a deceleration of a vehicle before the vehicle arrives at a deceleration assistance target point to turn left or right. The apparatus executes the deceleration assistance control of a first level as a deceleration assistance level of assisting the deceleration of the vehicle when first and second conditions are satisfied. The first condition is a condition that a target point distance between the vehicle and the deceleration assistance target point is equal to or shorter than a predetermined distance, and blinkers are activated. The second condition is a condition that the blinkers activated for changing traffic lanes continues being activated. The apparatus executes the deceleration assistance control of a second level lower than the first level until a predetermined time elapses since the first condition becomes satisfied while the second condition is satisfied.

6 Claims, 13 Drawing Sheets

(56) References Cited

U.S. PATENT DOCUMENTS

| | | |
|---|---|---|
| 10,118,617 B2 | 11/2018 | Urano et al. |
| 10,486,698 B2 | 11/2019 | Masui et al. |
| 2011/0010094 A1* | 1/2011 | Simon .................... G08G 1/167 |
| | | 701/301 |
| 2019/0295419 A1 | 9/2019 | Tosa et al. |
| 2020/0001875 A1* | 1/2020 | Kato .................. G01C 21/3602 |

* cited by examiner

VEHICLE DECELERATION ASSISTANCE APPARATUS AND METHOD, AND COMPUTER-READABLE STORAGE MEDIUM STORING VEHICLE DECELERATION ASSISTANCE PROGRAM

CROSS-REFERENCE TO RELATED APPLICATIONS

This application claims priority to Japanese patent application No. JP 2022-140831 filed on Sep. 5, 2022, the content of which is hereby incorporated by reference in its entirety.

BACKGROUND

Field

The invention relates to a vehicle deceleration assistance apparatus, a vehicle deceleration assistance method, and a computer-readable storage medium storing a vehicle deceleration assistance program.

Description of the Related Art

There is known a vehicle deceleration assistance apparatus which executes a deceleration assistance control to assist a deceleration of a vehicle when the vehicle arrives at a point near a traffic intersection. The known vehicle deceleration assistance apparatus is configured to determine that the vehicle will turn left or right at the traffic intersection and execute the deceleration assistance control when blinkers of the vehicle are activated, and a turning direction of the vehicle indicated by the activated blinkers corresponds to an allowed moving direction of a traffic lane in which the vehicle moves (for example, see JP 2020-4333 A1).

Thus, when the blinkers activated for changing the traffic lanes near the traffic intersection continue being activated, and the allowed moving direction of the vehicle having changed the traffic lanes corresponds to the turning direction indicated by the activated blinkers, the known vehicle deceleration assistance apparatus determines that the vehicle will turn left and right and execute the deceleration assistance control. In this regard, when the blinkers activated for changing the traffic lanes continue being activated after the vehicle has changed the traffic lanes, the driver may forget to deactivating the blinkers. In this case, the deceleration assistance control should not be executed.

SUMMARY

An object of the invention is to provide a vehicle deceleration assistance apparatus which can provide a suitable deceleration assistance by the deceleration assistance control when the vehicle changes the traffic lanes.

A vehicle deceleration assistance apparatus according to the invention comprises an electronic control unit configured to execute a deceleration assistance control to assist a deceleration of a vehicle before the vehicle arrives at a deceleration assistance target point where the vehicle is allowed to turn left or right. The electronic control unit is configured to execute the deceleration assistance control of a first level as a deceleration assistance level of assisting the deceleration of the vehicle when a first condition and a second condition are satisfied. The first condition is a condition that a target point distance is equal to or shorter than a predetermined distance, and blinkers of the vehicle are activated. The target point distance is a distance between the vehicle and the deceleration assistance target point. The second condition is a condition that the blinkers activated for changing traffic lanes continues being activated. The electronic control unit is further configured to execute the deceleration assistance control of a second level lower than the first level until a predetermined time elapses since the first condition becomes satisfied while the second condition is satisfied.

The blinkers are activated when the vehicle changes the traffic lanes. Thereafter, the blinkers may continue being activated even after the vehicle has changed the traffic lanes. In this case, even when the blinkers are activated, a driver of the vehicle may have no intension to turn the vehicle left or right. In this case, the deceleration assistance control of a normal deceleration assistance level should not be executed when the vehicle arrives at a point near the deceleration assistance target point.

With the vehicle deceleration assistance apparatus according to the invention, the deceleration assistance control of the deceleration assistance level (i.e., the second level) lower than the normal deceleration assistance level (i.e., the first level) when the vehicle arrives at the point near the deceleration assistance target point, i.e., the target point distance becomes equal to or shorter than the predetermined distance while the blinkers activated for changing the traffic lanes continue being activated after the vehicle has changed the traffic lanes. Thus, the suitable deceleration assistance can be provided by the deceleration assistance control when the vehicle changes the traffic lanes.

According to an aspect of the invention, the electronic control unit may be configured to execute the deceleration assistance control of a third level higher than the second level when (i) the first condition becomes satisfied while the second condition is satisfied, and (ii) a turning direction allowed for the vehicle is only a turning direction indicated by the activated blinkers.

The blinkers activated for changing the traffic lanes may continue being activated after the vehicle has changed the traffic lane to a left-side left-turn-only lane which allows the vehicle only to turn left. In this case, the vehicle must turn left at the deceleration assistance target point. Similarly, the blinkers activated for changing the traffic lanes may continue being activated after the vehicle has changed the traffic lane to a right-side right-turn-only lane which allows the vehicle only to turn right. In this case, the vehicle must turn right at the deceleration assistance target point. That is, when the turning direction allowed for the vehicle is only the turning direction indicated by the activated blinkers when the first condition becomes satisfied while the second condition is satisfied, the vehicle must turn at the deceleration assistance target point in the allowed turning direction. Thus, in this case, the deceleration assistance control of the higher deceleration assistance level should be executed.

With the vehicle deceleration assistance apparatus according to this aspect of the invention, the deceleration assistance control of the higher deceleration assistance level (i.e., the third level) is executed when the turning direction allowed for the vehicle is only the turning direction indicated by the activated blinkers when the first condition becomes satisfied while the second condition is satisfied. Thus, the suitable deceleration assistance can be provided by the deceleration assistance control when the vehicle changes the traffic lanes.

According to another aspect of the invention, the electronic control unit may be configured to execute the deceleration assistance control of a fourth level higher than the second level when (i) the blinkers becomes activated, and (ii) the first condition becomes satisfied after the target point distance becomes equal to or shorter than the predetermined distance.

In general, when the vehicle arrives at the point near the deceleration assistance target point and turns left or right at the deceleration assistance target point, the blinkers are activated. In this regard, when the vehicle turns left or right at the deceleration assistance target point after the vehicle completes changing the traffic lanes, and the blinkers are deactivated, the blinkers are activated again. Thus, when the vehicle arrives at the point near the deceleration assistance target point, and the blinkers are activated, the vehicle is likely to turn left or right at the deceleration assistance target point. In this case, the deceleration assistance control of the higher deceleration assistance level should be executed.

With the vehicle deceleration assistance apparatus according to this aspect of the invention, the deceleration assistance control of the higher deceleration assistance level (i.e., the fourth level) higher than the second level is executed when the blinkers are activated after the target point distance becomes equal to or shorter than the predetermined distance. Thus, the suitable deceleration assistance can be provided by the deceleration assistance control when the vehicle changes the traffic lanes.

According to further another aspect of the invention the electronic control unit may be configured to execute the deceleration assistance control of the first level after the predetermined time elapses since the first condition becomes satisfied even when the first and second conditions are satisfied.

When the vehicle arrives at the point near the deceleration assistance target point, and the blinkers have been activated for a certain time, a probability that the driver has an intension to turn the vehicle left or right, is high.

With the vehicle deceleration assistance apparatus according to this aspect of the invention, the deceleration assistance control of the first level is executed when the predetermined time elapses since the first condition becomes satisfied while the second condition is satisfied. Thus, the deceleration assistance in accordance with the intension of the driver to turn the vehicle left or right, can be provided.

A vehicle deceleration assistance method according to the invention is a method of executing a deceleration assistance control to assist a deceleration of a vehicle before the vehicle arrives at a deceleration assistance target point where the vehicle is allowed to turn left or right. The vehicle deceleration assistance method comprises a step of executing the deceleration assistance control of a first level as a deceleration assistance level of assisting the deceleration of the vehicle when a first condition and a second condition are satisfied. The first condition is a condition that a target point distance is equal to or shorter than a predetermined distance, and blinkers of the vehicle are activated. The target point distance is a distance between the vehicle and the deceleration assistance target point. The second condition is a condition that the blinkers activated for changing traffic lanes continues being activated. The vehicle deceleration assistance method comprises a step of executing the deceleration assistance control of a second level lower than the first level until a predetermined time elapses since the first condition becomes satisfied while the second condition is satisfied.

With the vehicle deceleration assistance method according to the invention, the suitable deceleration assistance can be provided by the deceleration assistance control when the vehicle changes the traffic lanes for the same reasons as the reasons described above.

A computer-readable storage medium stores a vehicle deceleration assistance program which executes a deceleration assistance control to assist a deceleration of a vehicle before the vehicle arrives at a deceleration assistance target point where the vehicle is allowed to turn left or right. The vehicle deceleration assistance program is configured to execute the deceleration assistance control of a first level as a deceleration assistance level of assisting the deceleration of the vehicle when a first condition and a second condition are satisfied. The first condition is a condition that a target point distance is equal to or shorter than a predetermined distance, and blinkers of the vehicle are activated. The target point distance is a distance between the vehicle and the deceleration assistance target point. The second condition is a condition that the blinkers activated for changing traffic lanes continues being activated. The vehicle deceleration assistance program is further configured to execute the deceleration assistance control of a second level lower than the first level until a predetermined time elapses since the first condition becomes satisfied while the second condition is satisfied.

With the vehicle deceleration assistance program according to the invention, the suitable deceleration assistance can be provided by the deceleration assistance control when the vehicle changes the traffic lanes for the same reasons as the reasons described above.

Elements of the invention are not limited to elements of embodiments and modified examples of the invention described with reference to the drawings. The other objects, features and accompanied advantages of the invention can be easily understood from the embodiments and the modified examples of the invention.

DESCRIPTION OF THE EMBODIMENTS

Below, a vehicle control apparatus including a vehicle deceleration assistance apparatus according to an embodiment of the invention will be described with reference to the drawings. It should be noted that examples described below are ones that vehicles are regulated by laws to move on the left side of a road. Therefore, when the vehicles are regulated by the laws to move on the right side of the road, terms "left" and "right" should be construed as "right" and "left", respectively.

Figure 1:
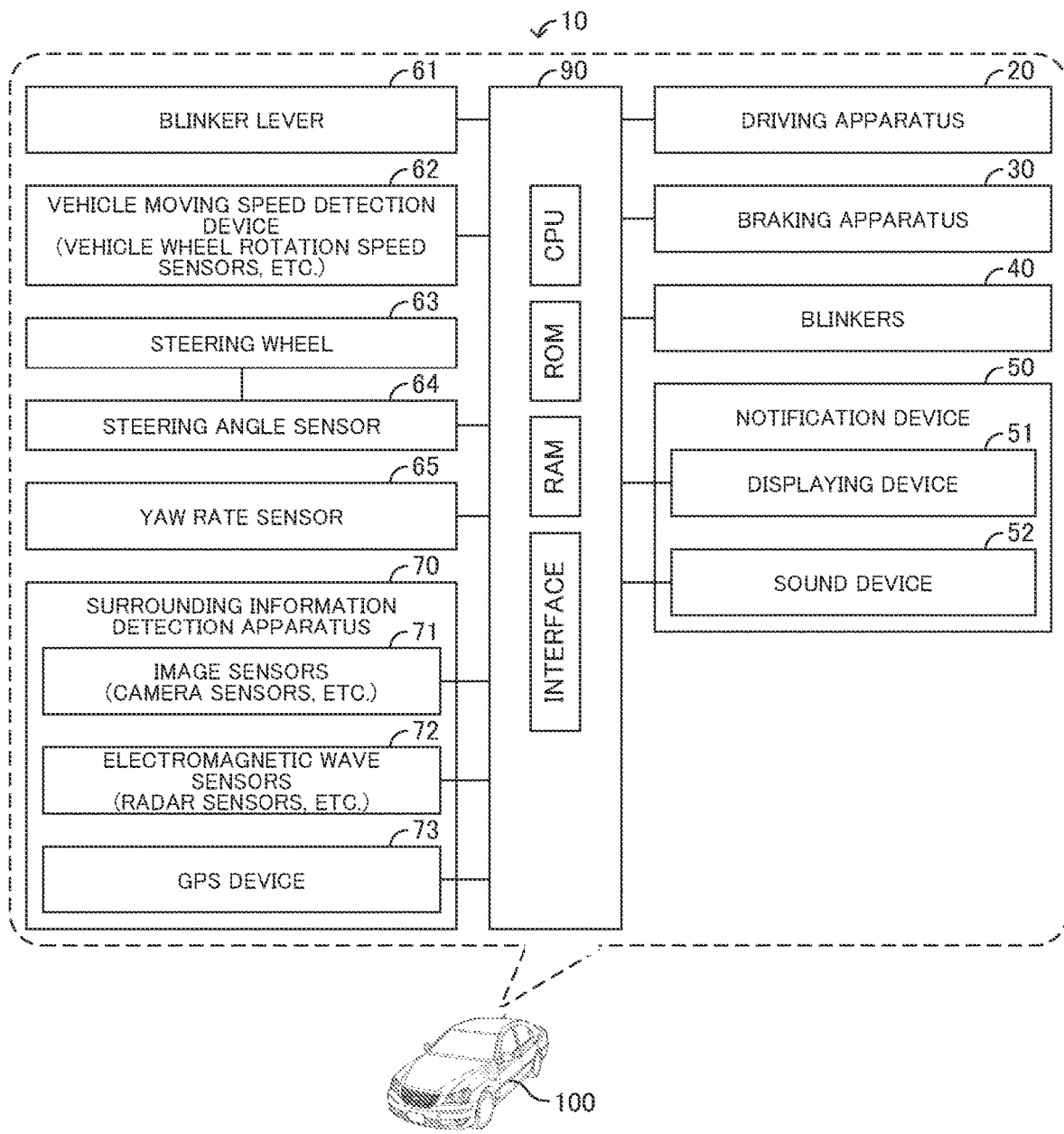
FIG. 1 is a view which shows a vehicle control apparatus including a vehicle deceleration assistance apparatus according to an embodiment of the invention.

As shown in FIG. 1, the vehicle control apparatus 10 according to the embodiment of the invention is installed on a vehicle 100. The vehicle control apparatus 10 includes an ECU 90.

The ECU 90 is an electronic control unit. The ECU 90 includes a microcomputer as a main component. The microcomputer includes a CPU, a ROM, a RAM, a non-volatile memory, and an interface. The CPU is configured or programmed to realize various functions by executing instructions, or programs, or routines stored in the ROM. In this embodiment, the vehicle control apparatus 10 includes one ECU. In this regard, the CPU may include ECUs and be configured to execute the processes by the ECUs, respectively.

A driving apparatus 20, a braking apparatus 30, blinkers 40, a notification device 50, a blinker lever 61, a vehicle moving speed detection device 62, a steering wheel 63, a steering angle sensor 64, a yaw rate sensor 65, and a surrounding information detection apparatus 70, are electrically connected to the ECU 90.

<Driving Apparatus>

The driving apparatus 20 is an apparatus which applies a driving force to the vehicle 100. The vehicle control apparatus 10 controls the driving force applied from the driving apparatus 20 to the vehicle 100.

<Braking Apparatus>

The braking apparatus 30 is an apparatus which applies a braking force to the vehicle 100. The vehicle control apparatus 10 decelerates the vehicle 100 by applying the braking force to the vehicle 100 from the braking apparatus 30.

<Blinkers>

Figure 2:
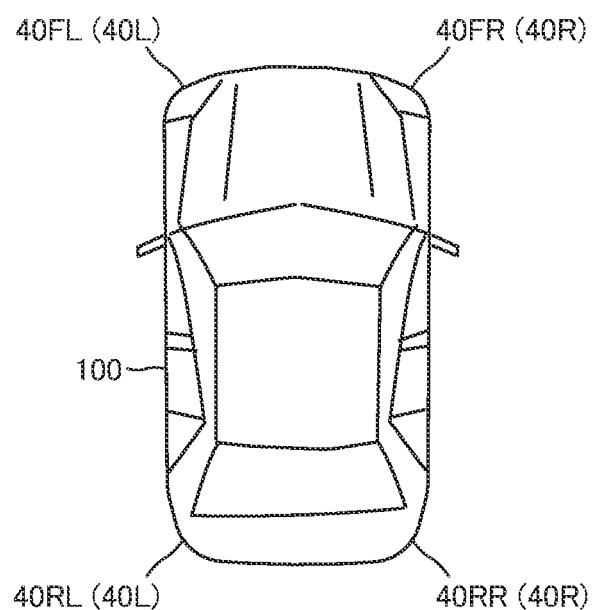
FIG. 2 is a view which shows blinkers of a vehicle.

The blinkers 40 are devices such as direction indicators which inform people outside of the vehicle 100 of a turning direction of the vehicle 100. In this embodiment, the blinkers 40 include right blinkers 40R and left blinkers 40L. As shown in FIG. 2, in this embodiment, the right blinkers 40R include a front right blinker 40FR and a rear right blinker 40RR. The front right blinker 40FR is mounted on a front right corner portion of the vehicle 100. The rear right blinker 40RR is mounted on a rear right corner portion of the vehicle 100. Further, the left blinkers 40L include a front left blinker 40FL and a rear left blinker 40RL. The front left blinker 40FL is mounted on a front left corner portion of the vehicle 100. The rear left blinker 40RL is mounted on a rear left corner portion of the vehicle 100. The right blinkers 40R are devices which inform the people outside of the vehicle 100 that the vehicle 100 turns in a right direction. The left blinkers 40L are devices which inform the people outside of the vehicle 100 that the vehicle 100 turns in a left direction.

The blinkers 40 are activated or deactivated by an operator of the vehicle 100. That is, the blinkers 40 change from an activated state to a deactivated state and vice versa. When the operator is a driver of the vehicle 100, the blinkers 40 are activated or deactivated by the driver operating a device such as a blinker lever provided on the vehicle 100. Further, when the operator is a remote operator, the blinkers 40 are activated or deactivated by the remote operator operating a device such as the blinker lever provided outside of the vehicle 100.

In this embodiment, the blinkers 40 are activated or deactivated by the driver of the vehicle 100 operating the blinker lever 61.

The operator of the vehicle 100 is the driver of the vehicle 100, i.e., a person who is in the vehicle 100 and directly drives the vehicle 100 or the remote operator of the vehicle 100, i.e., a person who is out of the vehicle 100 and remotely drives the vehicle 100.

<Notification Device>

The notification device 50 is a device which provides a notification to provide the operator of the vehicle 100 with various information. In this embodiment, the notification device 50 includes a displaying device 51 and a sound device 52.

The displaying device 51 is a device such as a display which displays various images. When the operator of the vehicle 100 is the driver of the vehicle 100, the displaying device 51 is a device such as a display installed on the vehicle 100. When the operator of the vehicle 100 is the remote operator of the vehicle 100, the displaying device 51 is a device such as the display installed in equipment by which the remote operator remotely drives the vehicle 100.

The vehicle control apparatus 10 proposes a deceleration of the vehicle 100 to the operator of the vehicle 100 by displaying an image to propose the deceleration of the vehicle 100 to the operator of the vehicle 100 by the displaying device 51.

The sound device 52 is a device such as a speaker which outputs various announcements. When the operator of the vehicle 100 is the driver of the vehicle 100, the sound device 52 is a device such as the speaker installed on the vehicle 100. When the operator of the vehicle 100 is the remote operator of the vehicle 100, the sound device 52 is a device such as the speaker installed in the equipment by which the remote operator remotely drives the vehicle 100.

The vehicle control apparatus 10 proposes the deceleration of the vehicle 100 to the operator of the vehicle 100 by outputting an announcement to propose the deceleration of the vehicle 100 to the operator of the vehicle 100 by the sound device 52.

<Vehicle Moving Speed Detection Device>

The vehicle moving speed detection device 62 is a device which detects an own vehicle moving speed V by vehicle wheel rotation speed sensors provided on vehicle wheels of the vehicle 100, respectively. The vehicle control apparatus 10 acquires the own vehicle moving speed V by the vehicle moving speed detection device 62.

<Steering Angle Sensor>

The steering angle sensor 64 is a sensor which detects a steering angle $\theta$ of the vehicle 100. The vehicle control apparatus 10 acquires the steering angle $\theta$ of the vehicle 100 by the steering angle sensor 64.

<Yaw Rate Sensor>

The yaw rate sensor 65 is a sensor which detects a yaw rate of the vehicle 100. The vehicle control apparatus 10 acquires the yaw rate $\omega$ of the vehicle 100 by the yaw rate sensor 65.

<Surrounding Information Detection Apparatus>

The surrounding information detection apparatus 70 is an apparatus which acquires surrounding detection information IS. In this embodiment, the surrounding information detection apparatus 70 includes image sensors 71, electromagnetic wave sensors 72 and a GPS device 73.

The image sensors 71 are sensors which take views around the vehicle 100 and acquire image data. The vehicle control apparatus 10 acquires the image data as the surrounding detection information IS by the image sensors 71.

The electromagnetic wave sensors 72 are sensors which acquire object data, i.e., data on objects around the vehicle 100. The electromagnetic wave sensors 72 are, for example, radio wave sensors such as radar sensors such as millimeter wave radars, sound sensors such as ultrasonic wave sensors such as clearance sonars, and optical sensors such as laser radars such as LiDARs. The electromagnetic wave sensors 72 transmit radio waves. The electromagnetic wave sensors 72 receives reflected waves, i.e., the radio waves reflected by the objects. The vehicle control apparatus 10 acquires the object data as the surrounding detection information IS by the electromagnetic wave sensors 72.

The GPS device 73 includes a GPS receiver and a map database. The GPS receiver receives so-called GPS signals. The vehicle control apparatus 10 acquires the GPS signals by the GPS receiver, specifies a present position of the vehicle 100, i.e., position information or own vehicle position information on a position of the vehicle 100, and acquires map information on an area around the present position of the vehicle 100 as the surrounding detection information IS, based on the present position of the vehicle 100 and the map database. The map information includes information on positions of traffic intersections, allowed moving directions of traffic lanes of a road, etc.

In this regard, the surrounding information detection apparatus 70 may be configured to acquire road information transmitted from equipment at the side of the road as the surrounding detection information IS.

<Operations of Vehicle Control Apparatus>

Next, operations of the vehicle control apparatus 10 will be described. When the vehicle 100 turns left or right at the traffic intersection, the operator decelerates the vehicle 100 before the vehicle 100 arrives at the traffic intersection. The vehicle control apparatus 10 is configured to execute a deceleration assistance control to assist a deceleration of the vehicle 100 carried out by the operator when the operator predictively decelerates the vehicle 100. That is, the vehicle control apparatus 10 is configured to execute the deceleration assistance control to assist the deceleration of the vehicle 100 before the vehicle 100 arrives at a deceleration assistance target point 300 where the vehicle 100 is allowed to turn left or right.

In this embodiment, the deceleration assistance control includes at least one of an autonomous deceleration control and a deceleration notification control.

The autonomous deceleration control is a control to control the own vehicle moving speed V equal to or smaller than a predetermined speed at a point of time when the vehicle 100 arrives at the deceleration assistance target point 300 by autonomously decelerating the vehicle 100. Thus, when the deceleration assistance control is the autonomous deceleration control, the vehicle control apparatus 10 is one of apparatuses which perform an automatic driving of the vehicle 100.

Further, the deceleration notification control is a control to provide the operator of the vehicle 100 with a notification to propose decelerating the vehicle 100 to the operator of the vehicle 100 by the notification device 50. In particular, the deceleration notification control is a control to display an image to propose the deceleration of the vehicle 100 by the displaying device 51 and/or output an announcement to propose the deceleration of the vehicle 100 by the sound device 52.

<Detection of Deceleration Assistance Target Point>

Figure 3:
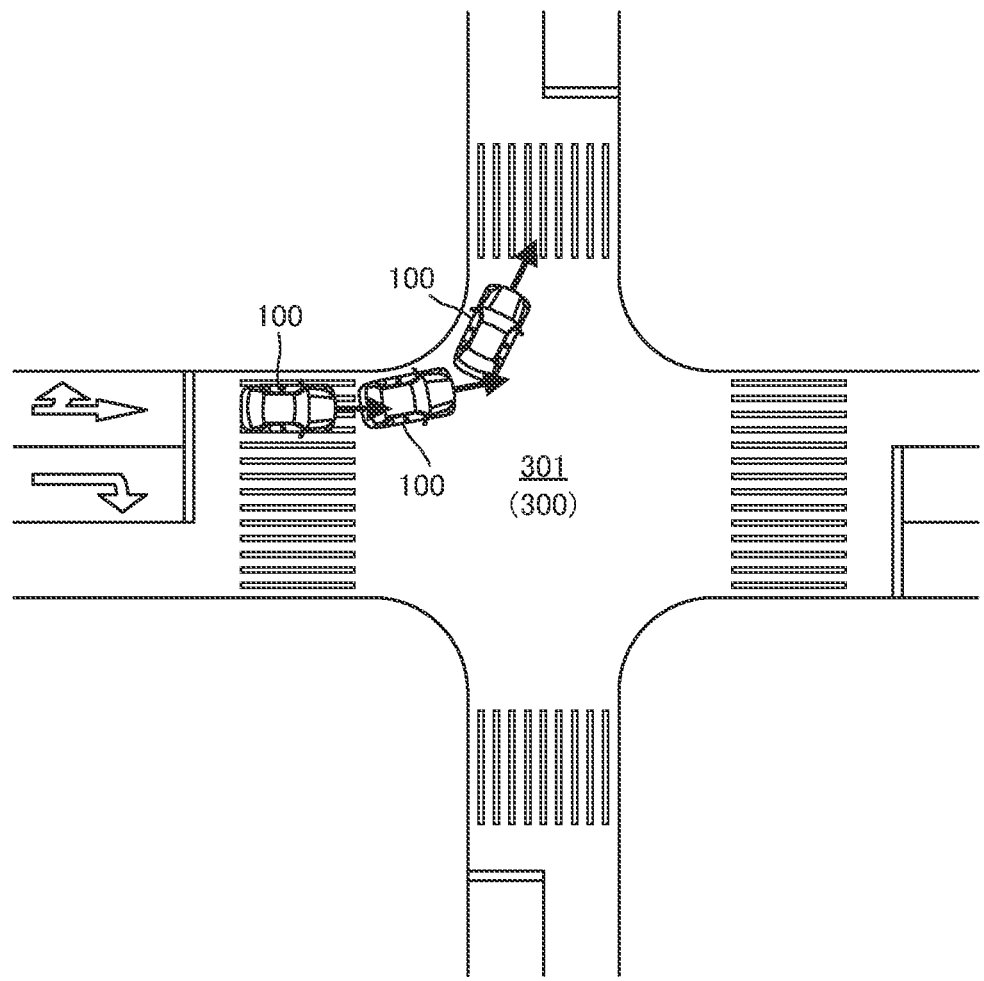
FIG. 3 is a view which shows a traffic intersection which is a deceleration assistance target point.

The vehicle control apparatus 10 repeatedly detects the deceleration assistance target point 300. The deceleration assistance target point 300 is a point where the vehicle 100 can turn left or right. The deceleration assistance target point 300 is, for example, a traffic intersection 301 shown in FIG. 3. The vehicle control apparatus 10 detects the deceleration assistance target point 300, based on the surrounding detection information IS.

<Acquisition of Target Point Distance>

Figure 4:
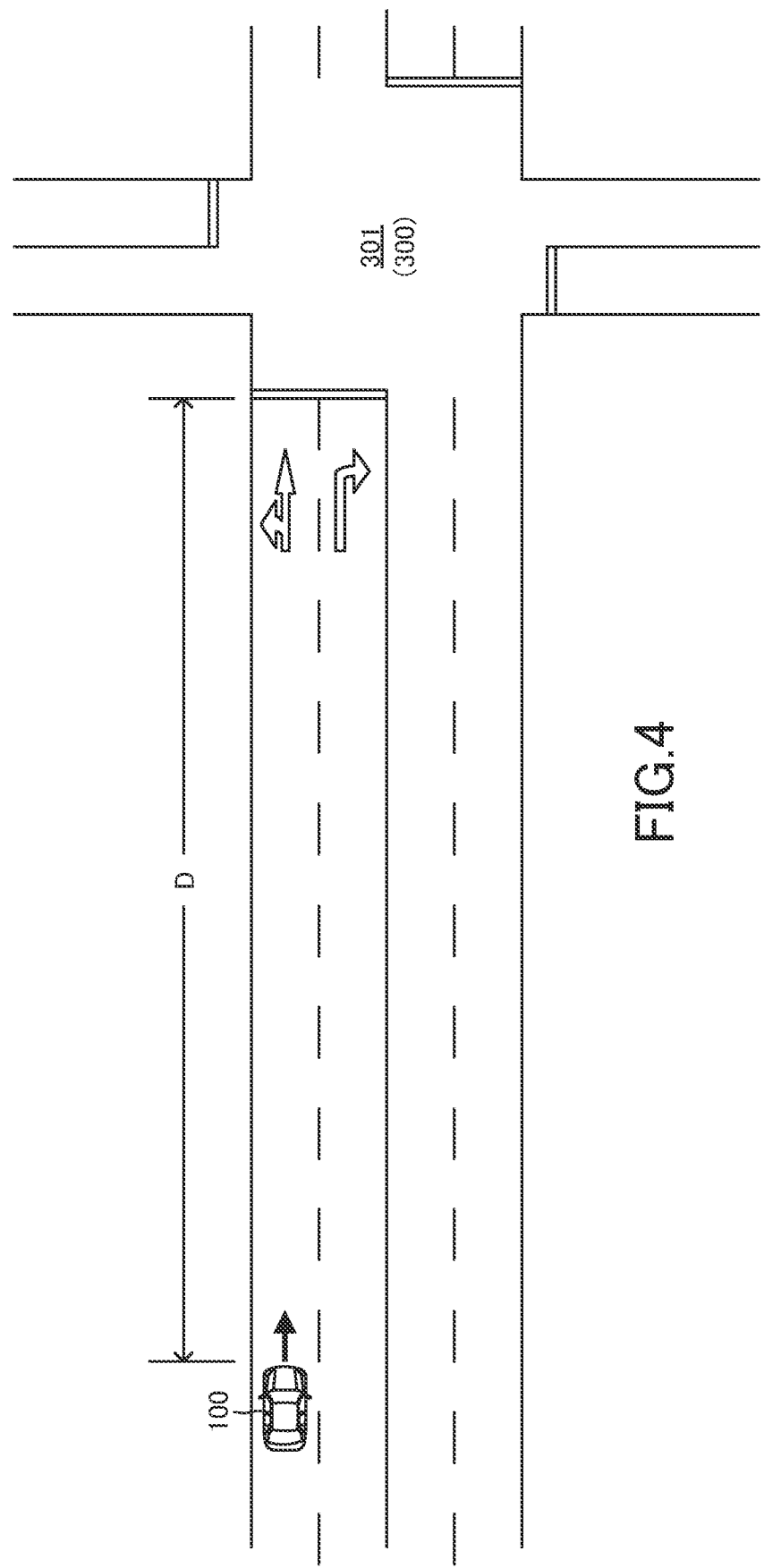
FIG. 4 is a view which shows a target point distance.

When the vehicle control apparatus 10 detects the deceleration assistance target point 300, the vehicle control apparatus 10 acquires a target point distance D. As shown in FIG. 4, the target point distance D is a distance between the vehicle 100 and the deceleration assistance target point 300. The vehicle control apparatus 10 acquires the target point distance D, based on the surrounding detection information IS.

<Determination of Assistance Determination Start Condition being Satisfied>

When the vehicle control apparatus 10 acquires the target point distance D, the vehicle control apparatus 10 determines whether an assistance determination start condition is satisfied. The assistance determination start condition is satisfied when the target point distance D is equal to or shorter than a predetermined distance or an assistance determination start distance Dth. The assistance determination start distance Dth is set to a distance which increases as the own vehicle moving speed V, i.e., the moving speed of the vehicle 100 increases.

<Acquisition of Allowed Moving Direction>

When the assistance determination start condition becomes satisfied, the vehicle control apparatus 10 acquires an allowed moving direction of an own vehicle moving lane.

The own vehicle moving lane is the traffic lane in which the vehicle 100 moves. The allowed moving direction of the own vehicle moving lane is a direction allowed for the vehicle to move. When the own vehicle moving lane is a left-turn-only lane, the allowed moving direction of the own vehicle moving lane is a left direction. When the own vehicle moving lane is a traffic lane for through traffic and a left turn, the allowed moving direction of the own vehicle moving lane is a straight direction and the left direction. When the own vehicle moving lane is a right-turn-only lane, the allowed moving direction of the own vehicle moving lane is a right direction. When the own vehicle moving lane is a traffic lane for the through traffic and a right turn, the allowed moving direction of the own vehicle moving lane is the straight direction and the right direction. When the own vehicle moving lane is a through lane, the allowed moving direction of the own vehicle moving lane is the straight direction.

The vehicle control apparatus 10 acquires the allowed moving direction of the own vehicle moving lane, based on the surrounding detection information IS. That is, the vehicle control apparatus 10 determines whether the own vehicle moving lane is the through lane, or the left-turn-only lane, or the traffic lane for the through traffic and the left turn, or the right-turn-only lane, the traffic lane for the through traffic and the right turn, based on road surface markings of the own vehicle moving lane detected, based on the image data of the surrounding detection information IS, or based on the own vehicle position information and the map information. Then, the vehicle control apparatus 10 acquires the allowed moving direction.

<Determination of Deceleration Assistance Condition being Satisfied>

When the vehicle control apparatus 10 acquires the allowed moving direction of the own vehicle moving lane, the vehicle control apparatus 10 determines whether a deceleration assistance condition or a first condition is satisfied.

For example, the deceleration assistance condition may include at least a condition that the blinkers 40 are activated. That is, the deceleration assistance condition may include at least a condition that (i) the target point distance D is equal to or shorter than the predetermined distance or the assistance determination start distance Dth, and (ii) the blinkers 40 are activated.

Figure 5:
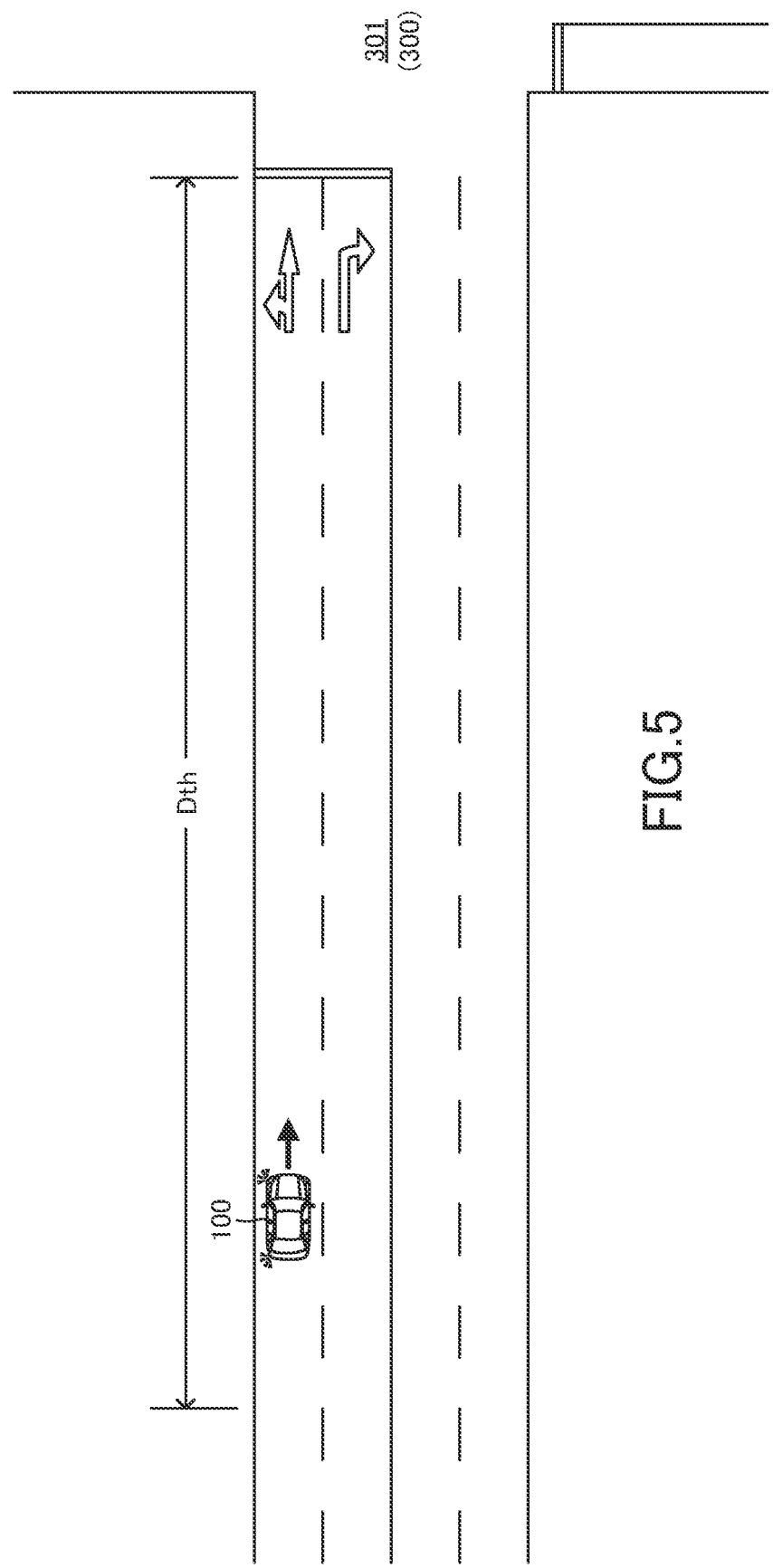
FIG. 5 is a view which shows a scene that a deceleration assistance condition is satisfied.

In this embodiment, as shown in FIG. 5, the deceleration assistance condition is satisfied when (i) the left blinkers 40L are activated, and (ii) the own vehicle moving lane is the traffic lane for the through traffic and the left turn. That is, the deceleration assistance condition is satisfied when (i) the target point distance D is equal to or shorter than the assistance determination start distance Dth, (ii) the left blinkers 40L are activated, and (iii) the own vehicle moving lane is the traffic lane for the through traffic and the left turn.

Figure 6:
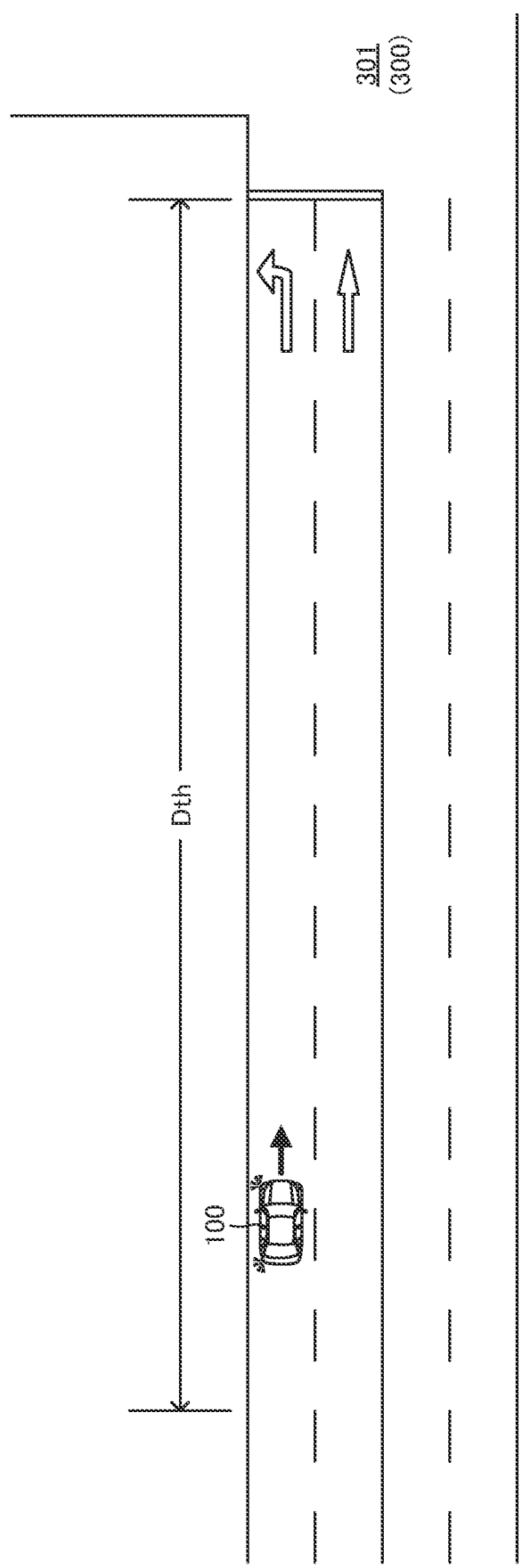
FIG. 6 is a view which shows another scene that the deceleration assistance condition is satisfied.

Similarly, in this embodiment, as shown in FIG. 6, the deceleration assistance condition is also satisfied when (i) the left blinkers 40L are activated, and (ii) the own vehicle moving lane is the left-turn-only lane. That is, the deceleration assistance condition is also satisfied when (i) the target point distance D is equal to or shorter than the assistance determination start distance Dth, (ii) the left blinkers 40L are activated, and (iii) the own vehicle moving lane is the left-turn-only lane.

Thus, the deceleration assistance condition is satisfied when (i) the target point distance D is equal to or shorter than the assistance determination start distance Dth, (ii) the left blinkers 40L are activated, and (iii) the own vehicle moving lane is the traffic lane which allows the vehicle to turn left (i.e., the traffic lane for the through traffic and the left turn or the left-turn-only lane).

Figure 7:
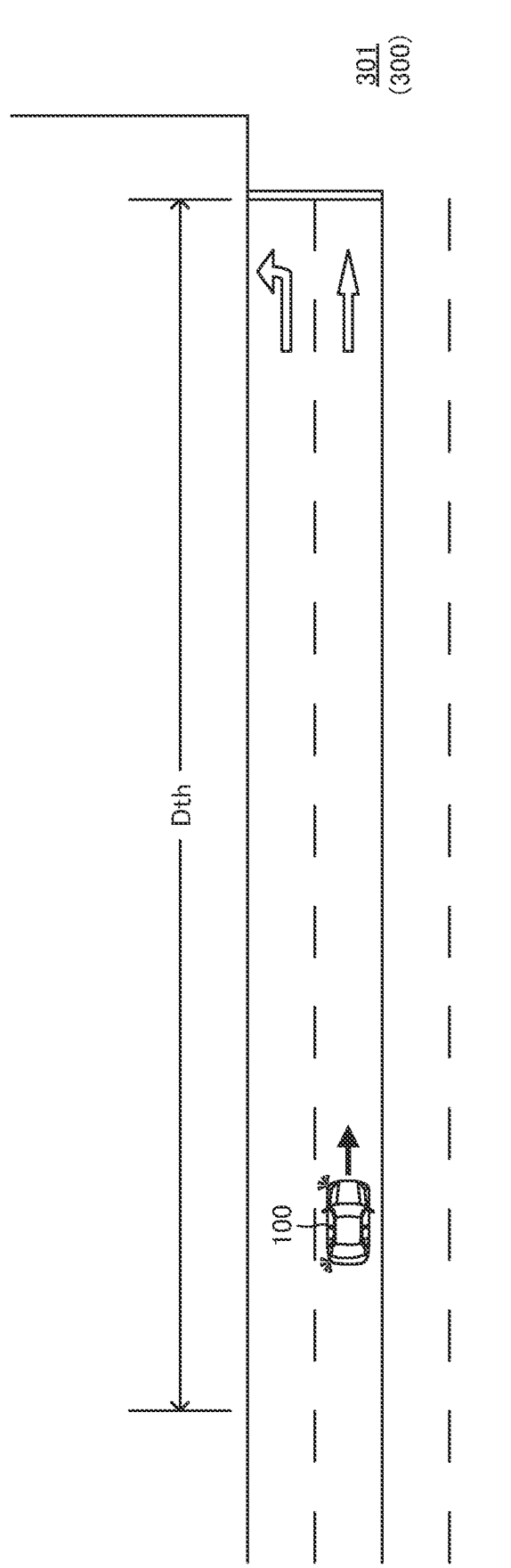
FIG. 7 is a view which shows a scene that the deceleration assistance condition is not satisfied.
Figure 8:
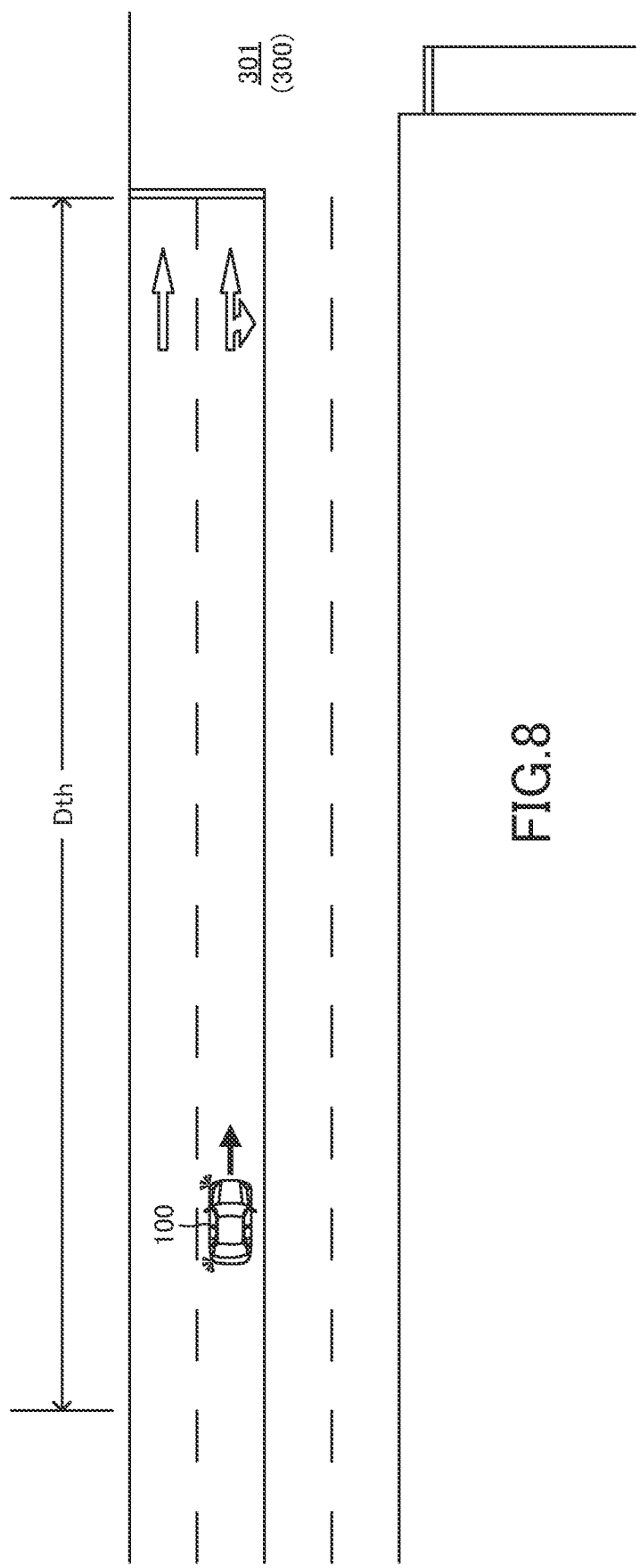
FIG. 8 is a view which shows another scene that the deceleration assistance condition is not satisfied.
Figure 9:
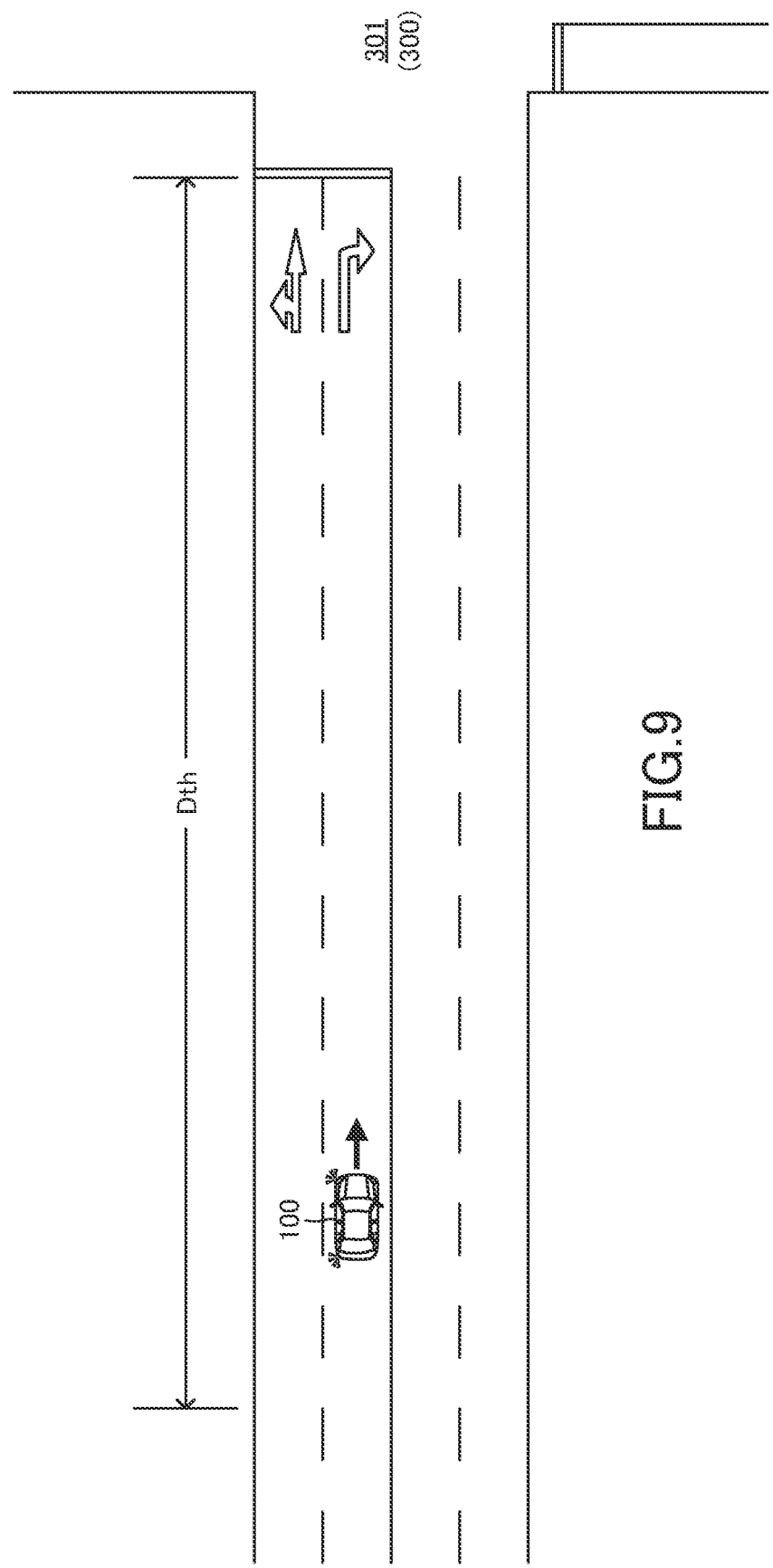
FIG. 9 is a view which shows further another scene that the deceleration assistance condition is not satisfied.

Therefore, when the left blinkers 40L are activated, but the own vehicle moving lane is the through lane as shown in FIG. 7, or when the left blinkers 40L are activated, but the own vehicle moving lane is the traffic lane for the through traffic and the right turn as shown in FIG. 8, or when the left blinkers 40L are activated, but the own vehicle moving lane is the right-turn-only lane, the deceleration assistance condition is not satisfied.

Further, in this embodiment, the deceleration assistance condition is satisfied when (i) the right blinkers 40R are activated, and (ii) the own vehicle moving lane is the traffic lane for the through traffic and the right turn. That is, the deceleration assistance condition is satisfied when (i) the target point distance D is equal to or shorter than the assistance determination start distance Dth, (ii) the right blinkers 40R are activated, and (iii) the own vehicle moving lane is the traffic lane for the through traffic and the right turn.

Similarly, in this embodiment, the deceleration assistance condition is also satisfied when (i) the right blinkers 40R are activated, and (ii) the own vehicle moving lane is the right-turn-only lane. That is, the deceleration assistance condition is also satisfied when (i) the target point distance D is equal to or shorter than the assistance determination start distance Dth, (ii) the right blinkers 40R are activated, and (iii) the own vehicle moving lane is the right-turn-only lane.

Thus, the deceleration assistance condition is satisfied when (i) the target point distance D is equal to or shorter than the assistance determination start distance Dth, (ii) the right blinkers 40R are activated, and (iii) the own vehicle moving lane is the traffic lane which allows the vehicle to turn right (i.e., the traffic lane for the through traffic and the right turn or the right-turn-only lane).

Therefore, when the right blinkers 40R are activated, but the own vehicle moving lane is the through lane, or when the right blinkers 40R are activated, but the own vehicle moving lane is the traffic lane for the through traffic and the left turn, or when the right blinkers 40R are activated, but the own vehicle moving lane is the left-turn-only lane, the deceleration assistance condition is not satisfied.

Therefore, the deceleration assistance condition is satisfied when (i) the blinkers 40 are activated, and (ii) the turning direction of the vehicle 100 indicated by the activated blinkers 40 corresponds to the allowed turning direction of the own vehicle moving lane. That is, the deceleration assistance condition is satisfied when (i) the target point distance D is equal to or shorter than the assistance determination start distance Dth, (ii) the blinkers 40 are activated, and (iii) the turning direction of the vehicle 100 indicated by the activated blinkers 40 corresponds to the allowed turning direction of the own vehicle moving lane.

The allowed turning direction of the own vehicle moving lane is a direction allowed for the vehicle 100 moving in the own vehicle moving lane to turn. When the own vehicle moving lane is the traffic lane for the through traffic and the left turn, the allowed turning direction of the own vehicle moving lane is the left direction. When the own vehicle moving lane is the left-turn-only lane, the allowed turning direction of the own vehicle moving lane is the left direction. When the own vehicle moving lane is the traffic lane for the through traffic and the right turn, the allowed turning direction of the own vehicle moving lane is the right direction. When the own vehicle moving lane is the right-turn-only lane, the allowed turning direction of the own vehicle moving lane is the right direction.

It should be noted that the deceleration assistance condition may be satisfied when the own vehicle moving lane is a left-and-right-turn lane, independently of whether the blinkers 40 are activated. That is, the deceleration assistance condition may be satisfied when (i) the target point distance D is equal to or shorter than the assistance determination start distance Dth, and (ii) the own vehicle moving lane is the left-and-right-turn lane.

The left-and-right-turn lane is the traffic lane which allows the vehicle to turn left and/or right. Thus, the left-and-right-turn lane is the traffic lane other than the through lane. In other words, the left-and-right-turn lane is any one of the traffic lane for the through traffic and the left turn, the left-turn-only lane, the traffic lane for the through traffic and the right turn, and the right-turn-only lane.

Further, the deceleration assistance condition may be satisfied when (i) the blinkers 40 are activated, and (ii) the own vehicle moving lane is the left-and-right-turn lane. That is, the deceleration assistance condition may be satisfied when (i) the target point distance D is equal to or shorter than the assistance determination start distance Dth, (ii) the blinkers 40 are activated, and (iii) the own vehicle moving lane is the left-and-right-turn lane.

<Execution of Deceleration Assistance Control>

The vehicle control apparatus 10 repeatedly determines whether a forbiddance condition described below or a second condition is satisfied. When (i) the deceleration assistance condition becomes satisfied, and (ii) the forbiddance condition is not satisfied, the vehicle control apparatus 10 allows starting to execute the deceleration assistance control and as a result, executes the deceleration assistance control. In addition, when (i) the deceleration assistance condition is satisfied, and (ii) the forbiddance condition becomes unsatisfied after (i) the deceleration assistance condition becomes satisfied, and (ii) the forbiddance condition is satisfied, the vehicle control apparatus 10 allows starting to execute the deceleration assistance control and as a result, executes the deceleration assistance control.

<Determination of Forbiddance Condition being Satisfied>

As described above, the vehicle control apparatus 10 repeatedly determines whether the forbiddance condition is satisfied.

Figure 10:
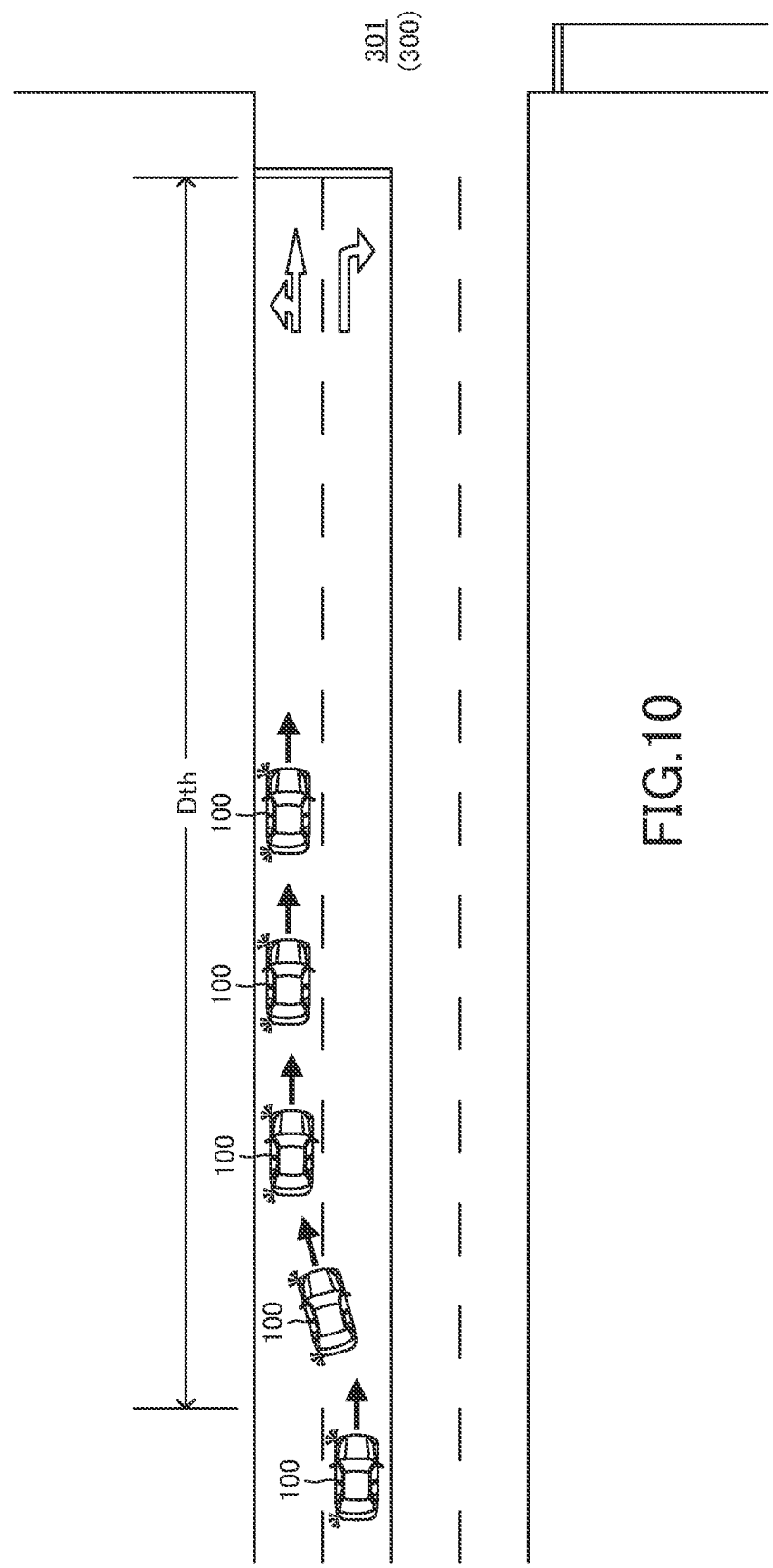
FIG. 10 is a view which shows a scene that the deceleration assistance condition is satisfied, and a forbiddance condition is satisfied when the vehicle changes traffic lanes.

As shown in FIG. 10, when the target point distance D becomes equal to or shorter than the assistance determination start distance Dth while the left blinkers 40L activated for changing the traffic lane to a left side lane continue being activated after the vehicle 100 has changed the traffic lanes, the deceleration assistance condition is satisfied. In this case, as shown in FIG. 10, even when the own vehicle moving lane is the traffic lane for the through traffic and the left turn, the operator of the vehicle 100 may not have an intension to turn the vehicle 100 left and may simply forget to disactivate the left blinkers 40L. Thus, in this case, the deceleration assistance control should not be executed.

Figure 11:
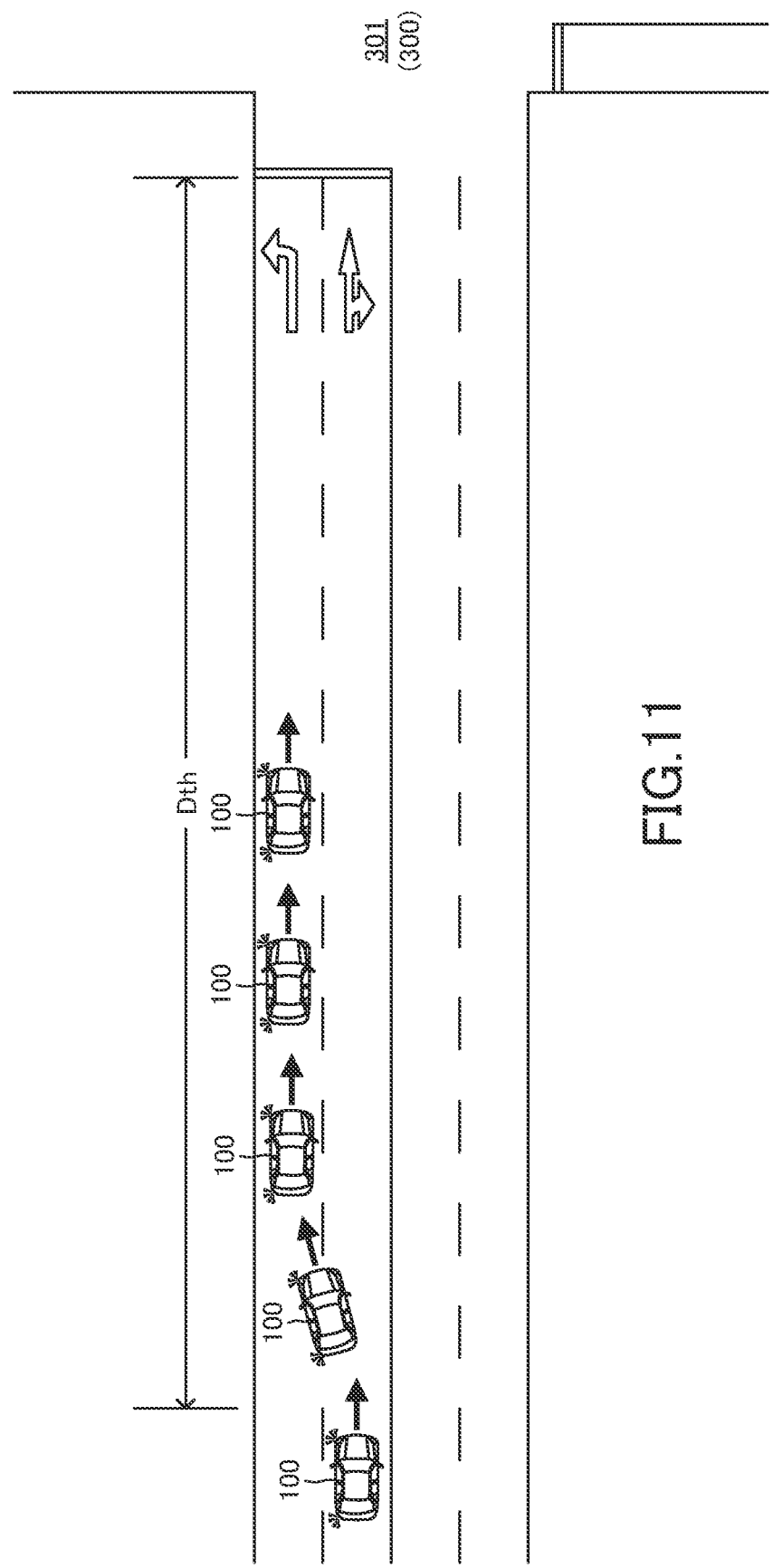
FIG. 11 is a view which shows a scene that the deceleration assistance condition is satisfied, and the forbiddance condition is not satisfied when the vehicle changes the traffic lanes.

As shown in FIG. 11, when the target point distance D becomes equal to or shorter than the assistance determination start distance Dth while the left blinkers 40L activated for changing the traffic lane to the left side lane continue being activated after the vehicle 100 has changed the traffic lanes, the deceleration assistance condition is satisfied. In this case, when the own vehicle moving lane is the left-turn-only lane, the operator of the vehicle 100 is likely to have an intension to turn the vehicle 100 left after the operator of the vehicle 100 changes the traffic lanes.

Thus, in this case, executing the deceleration assistance control may not raise problems.

Accordingly, the forbiddance condition includes at least a condition that the blinkers 40 activated for changing the traffic lanes continue being activated.

In this embodiment, the forbiddance condition becomes satisfied when (i) the target point distance D becomes equal to or shorter than the assistance determination start distance Dth, and (ii) the own vehicle moving lane is not the left-turn-only lane while the left blinkers 40L activated for changing the traffic lane to the left side lane continue being activated after the vehicle 100 has changed the traffic lanes.

Then, the forbiddance condition continues being satisfied for a predetermined time Tth since the deceleration assistance condition becomes satisfied as far as the left blinkers 40L continue being activated. Then, the forbiddance condition becomes unsatisfied when the predetermined time Tth elapses.

Figure 12:
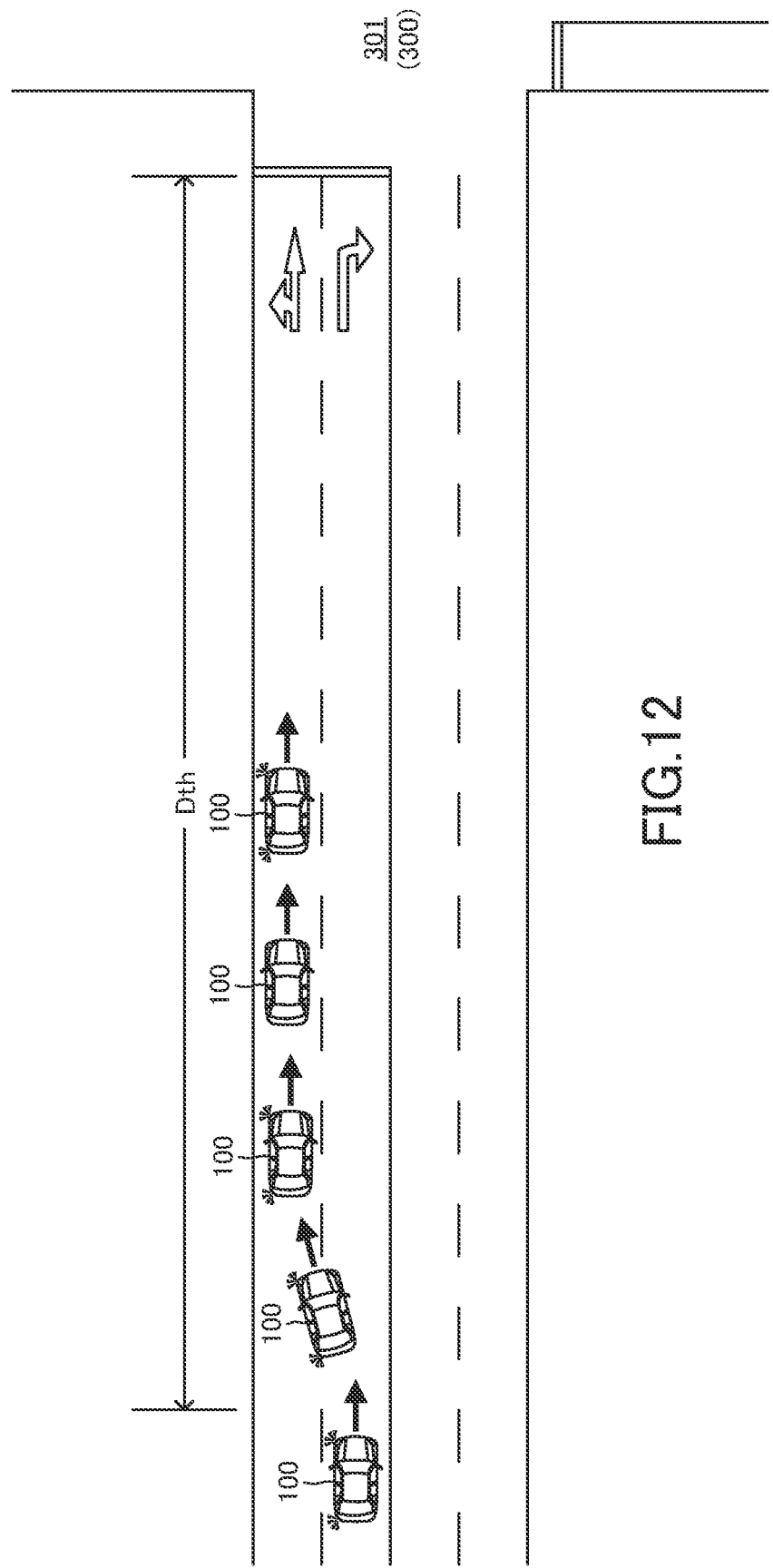
FIG. 12 is a view which shows another scene that the deceleration assistance condition is satisfied, and the forbiddance condition is not satisfied when the vehicle changes the traffic lanes.

In this embodiment, the forbiddance condition becomes unsatisfied when the left blinkers 40L are deactivated before the predetermined time Tth elapses from the deceleration assistance condition becoming satisfied. Accordingly, as shown in FIG. 12, when the target point distance D becomes equal to or shorter than the assistance determination start distance Dth while the left blinkers 40L activated for changing the traffic lane to the left side lane continue being activated after the vehicle 100 has changed the traffic lanes, the deceleration assistance condition is satisfied. In this case, the own vehicle moving lane is the traffic lane for the through traffic and the left turn. Thus, when the left blinkers 40L are activated after the forbiddance condition becomes unsatisfied in response to the left blinkers 40L being deactivated before the predetermined time Tth elapses from the forbiddance condition becoming satisfied, the forbiddance condition does not become satisfied. However, the deceleration assistance condition becomes satisfied. Therefore, the deceleration assistance control is allowed to start to be executed and as a result, the deceleration assistance control is executed.

Further, when the forbiddance condition becomes unsatisfied in response to the left blinkers 40L being deactivated before the predetermined time Tth elapses from the deceleration assistance condition becoming satisfied, the left blinkers 40L are not activated. Thus, the deceleration assistance condition becomes unsatisfied and as a result, the deceleration assistance control is not executed.

Furthermore, in this embodiment, the forbiddance condition becomes satisfied when (i) the target point distance D becomes equal to or shorter than the assistance determination start distance Dth, and (ii) the own vehicle moving lane is not the right-turn-only lane while the right blinkers 40R activated for changing the traffic lane to a right side lane continue being activated after the vehicle 100 has changed the traffic lanes.

Then, the forbiddance condition continues being satisfied for the predetermined time Tth from the deceleration assistance condition becoming satisfied as far as the right blinkers 40R continue being activated. Then, the forbiddance condition becomes unsatisfied when the predetermined time Tth elapses.

In this embodiment, the forbiddance condition becomes unsatisfied when the right blinkers 40R are deactivated before the predetermined time Tth elapses from the deceleration assistance condition becoming satisfied. Accordingly, when the target point distance D becomes equal to or shorter than the assistance determination start distance Dth while the right blinkers 40R activated for changing the traffic lane to the right side lane continue being activated after the vehicle 100 has changed the traffic lanes, the deceleration assistance condition is satisfied. In this case, the own vehicle moving lane is the traffic lane for the through traffic and the left turn. Thus, when the right blinkers 40R are activated after the forbiddance condition becomes unsatisfied in response to the right blinkers 40R being deactivated before the predetermined time Tth elapses from the forbiddance condition becoming satisfied, the forbiddance condition does not become satisfied. However, the deceleration assistance condition becomes satisfied. Therefore, the deceleration assistance control is allowed to start to be executed and as a result, the deceleration assistance control is executed.

Further, when the predetermined time Tth elapses, and forbiddance condition becomes unsatisfied before the vehicle 100 arrives at the deceleration assistance target point 300, the deceleration assistance condition is satisfied. Thus, the deceleration assistance control is allowed to start to be executed and as a result, the deceleration assistance control is executed, independently of the target point distance D. In this regard, the deceleration assistance condition may become satisfied when the vehicle 100 arrives at a point near the deceleration assistance target point 300 when the forbiddance condition becomes unsatisfied in response to the predetermined time Tth elapsing before the vehicle 100 arrives at the deceleration assistance target point 300. That is, the deceleration assistance condition may become unsatisfied when the target point distance D is equal to or shorter than a predetermined distance or a deceleration assistance non-execution distance when the forbiddance condition becomes unsatisfied in response to the predetermined time Tth elapsing before the vehicle 100 arrives at the deceleration assistance target point 300. The deceleration assistance non-execution distance is shorter than the assistance determination start distance Dth.

Further, when the forbiddance condition becomes unsatisfied in response to the left blinkers 40L being deactivated before the predetermined time Tth elapses from the deceleration assistance condition becoming satisfied, the left blinkers 40L are not activated. Thus, the deceleration assistance condition becomes unsatisfied and as a result, the deceleration assistance control is not executed.

As described above, in this embodiment, the forbiddance condition becomes satisfied when the target point distance D is equal to or shorter than the assistance determination start distance Dth, and the allowed turning direction of the own vehicle moving lane is not only the turning direction indicated by the blinkers 40 activated for changing the traffic lanes when the blinkers 40 activated for changing the traffic lanes continue being activated after the vehicle 100 has changed its traffic lane to the traffic lane next to the own vehicle moving lane.

Thereby, as shown in FIG. 10, when the left blinkers 40L activated for changing the traffic lanes continue being activated after the vehicle 100 has changed its traffic lane to the left side lane, and it is unclear whether the operator of the vehicle 100 has an intension to turn the vehicle 100 left since the own vehicle moving lane is the traffic lane for the through traffic and the left turn, the deceleration assistance control is forbidden to start to be executed and as a result, the deceleration assistance control is not executed until the predetermined time Tth elapses even when the left blinkers 40L continue being activated. Then, when the predetermined time Tth elapses, and the left blinkers 40L are still activated, the operator of the vehicle 100 is likely to have an intension to turn the vehicle 100 left. Thus, the deceleration assistance control is allowed to start to be execute and as a result, the deceleration assistance control is executed.

On the other hand, as shown in FIG. 11, when the left blinkers 40L activated for changing the traffic lanes continue being activated after the vehicle 100 has changed its traffic lane to the left side lane, and the operator of the vehicle 100 is likely to have an intension to turn the vehicle 100 left since the own vehicle moving lane is the left-turn-only lane, the deceleration assistance control is allowed to start to be executed and as a result, the deceleration assistance control is executed.

Further, as shown in FIG. 12, after the deceleration assistance control is forbidden to start to be executed and as a result, the deceleration assistance control is not executed because the left blinkers 40L activated for changing the traffic lanes continue being activated after the vehicle 100 has changed its traffic lane to the left side lane, and the own vehicle moving lane is the traffic lane for the through traffic and the left turn, the deceleration assistance control is allowed to start to be executed and as a result, the deceleration assistance control is executed when the left blinkers 40L are activated after the left blinkers 40L are deactivated and as a result, the operator of the vehicle 100 is likely to have an intension to turn the vehicle 100 left.

Therefore, with the vehicle control apparatus 10, the deceleration assistance control is suitably executed, and the suitable deceleration assistance can be provided to the operator.

In this embodiment, the vehicle control apparatus 10 determines whether the vehicle 100 has changed the traffic lanes, based on states of the blinkers 40, the steering angle θ, and the yaw rate ω. In this regard, the vehicle control apparatus 10 may be configured to determine whether the vehicle 100 has changed the traffic lanes, based on the surrounding detection information IS, in particular, the image data and/or the own vehicle position information.

Further, in the embodiment described above, the vehicle control apparatus 10 does not execute the deceleration assistance control when the deceleration assistance condition becomes satisfied, and the forbiddance condition is satisfied. In this regard, the vehicle control apparatus 10 may be configured to execute the deceleration assistance control of the deceleration assistance level (i.e., the level of assisting the deceleration of the vehicle 100 by the deceleration assistance control) lower the normal deceleration assistance level (i.e., the deceleration assistance level when the deceleration assistance condition becomes satisfied, and the forbiddance condition is not satisfied) when the deceleration assistance condition becomes satisfied, and the forbiddance condition is satisfied.

In other words, the vehicle control apparatus 10 may be configured to execute the deceleration assistance control, setting the deceleration assistance level to the first level when (i) the deceleration assistance condition becomes satisfied, and (ii) the forbiddance condition that the blinkers 40 activated for changing the traffic lanes continue being activated, is not satisfied, and execute the deceleration assistance control, setting the deceleration assistance level to the second level lower than the first level until the predetermined time Tth elapses from the deceleration assistance condition becoming satisfied. It should be noted that the second level may be the deceleration assistance level that the deceleration assistance control is not executed.

In other words, the vehicle control apparatus 10 may be configured to execute the deceleration assistance control of the deceleration assistance level lower than the deceleration assistance level for a case that the forbiddance condition is not satisfied when (i) the deceleration assistance condition becomes satisfied, and (ii) the forbiddance condition that the blinkers 40 activated for changing the traffic lanes continue being activated, is satisfied.

As a process to lower the deceleration assistance level, a process to execute one of the autonomous deceleration control and the deceleration notification control as the deceleration assistance control of the second level may be employed when the autonomous deceleration control and the deceleration notification control are both executed as the deceleration assistance control of the first level.

Further, the vehicle control apparatus 10 may be configured to execute the deceleration assistance control of a third level higher than the second level when the turning direction allowed for the vehicle 100 is only the turning direction of the vehicle 100 indicated by the activated blinkers 40 even when the deceleration assistance condition becomes satisfied, and the forbiddance condition is satisfied.

Furthermore, the vehicle control apparatus 10 may be configured to execute the deceleration assistance control of a fourth level higher than the second level when the deceleration assistance condition becomes satisfied in response to the blinkers 40 being activated after the target point distance D becomes the predetermined distance or the assistance determination start distance Dth.

Furthermore, in this embodiment, the vehicle control apparatus 10 is configured to continue executing the deceleration assistance control without stopping executing the deceleration assistance control even when a condition such as the forbiddance condition described above for forbidding starting to execute the deceleration assistance control, becomes satisfied after stopping executing the deceleration assistance control.

<Specific Operations of Vehicle Control Apparatus>

Figure 13:
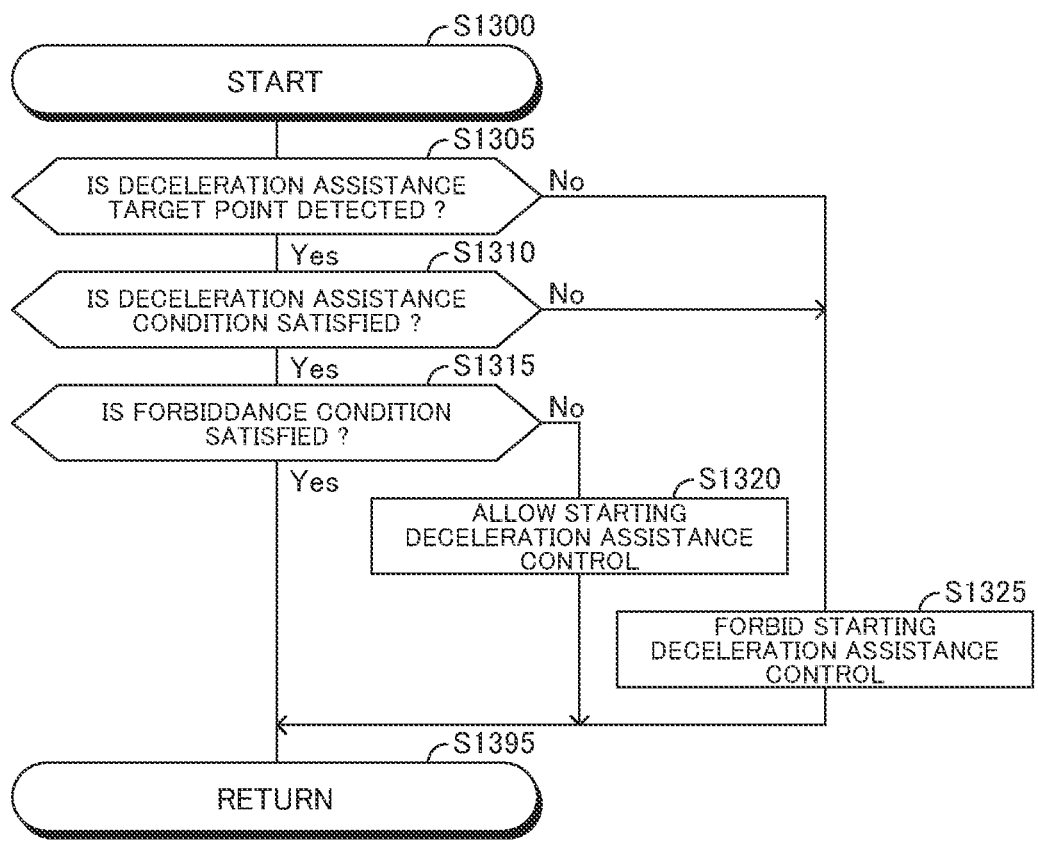
FIG. 13 is a view which shows a flowchart of a routine executed by the vehicle control apparatus according to the embodiment of the invention.

Next, specific operations of the vehicle control apparatus 10 will be described. The vehicle control apparatus 10 is configured to execute a routine shown in FIG. 13 with a predetermined calculation cycle. Thus, at a predetermined timing, the vehicle control apparatus 10 starts a process from a step S1300 of the routine shown in FIG. 13 and proceeds with the process to a step S1305 to determine whether the deceleration assistance target point 300 is detected.

When the vehicle control apparatus 10 determines "Yes" at the step S1305, the vehicle control apparatus 10 proceeds with the process to a step S1310 to determine whether the deceleration assistance condition is satisfied. When the vehicle control apparatus 10 determines "Yes" at the step S1310, the vehicle control apparatus 10 proceeds with the process to a step S1315 to determine whether the forbiddance condition is satisfied. When the vehicle control apparatus 10 determines "Yes" at the step S1315, the vehicle control apparatus 10 proceeds with the process directly to a step S1395 to terminate executing this routine once. In this case, the vehicle control apparatus 10 does not execute the deceleration assistance control.

On the other hand, when the vehicle control apparatus 10 determines "No" at the step S1315, the vehicle control apparatus 10 proceeds with the process to a step S1320 to allow executing the deceleration assistance control. In this case, the vehicle control apparatus 10 executes the deceleration assistance control. Then, the vehicle control apparatus 10 proceeds with the process to the step S1395 to terminate executing this routine once.

Further, when the vehicle control apparatus 10 determines "No" at the step S1305 or the step S1310, the vehicle control apparatus 10 proceeds with the process to a step S1325 to forbid starting to execute the deceleration assistance control. In this case, when the vehicle control apparatus 10 does not execute the deceleration assistance control, the vehicle control apparatus 10 does not start to execute the deceleration assistance control. On the other hand, when the vehicle control apparatus 10 executes the deceleration assistance control, the vehicle control apparatus 10 continues executing the deceleration assistance control. Then, the vehicle control apparatus 10 proceeds with the process to the step S1395 to terminate executing this routine once.

The specific operations of the vehicle control apparatus 10 have been described.

It should be noted that the invention is not limited to the aforementioned embodiments, and various modifications can be employed within the scope of the invention.

What is claimed is:

1. A vehicle deceleration assistance apparatus, comprising an electronic control unit configured to execute a deceleration assistance control to assist a deceleration of a vehicle before the vehicle arrives at a deceleration assistance target point where the vehicle is allowed to turn left or right, wherein the electronic control unit is configured to:
   obtain surrounding detection information from at least one sensor;
   detect the deceleration assistance target point based on the surrounding detection information;
   execute the deceleration assistance control of a first level as a deceleration assistance level of assisting the deceleration of the vehicle when a first condition is satisfied and a second condition is not satisfied,
   the first condition being a condition that a target point distance is equal to or shorter than a predetermined distance, and blinkers of the vehicle are activated,
   the target point distance being a distance between the vehicle and the deceleration assistance target point,
   the second condition being a condition that the blinkers activated for changing traffic lanes continue being activated; and
   execute the deceleration assistance control of a second level lower than the first level from a time when the second condition becomes satisfied until a predetermined time elapses from a time when the first condition becomes satisfied,
   wherein the deceleration assistance control is at least one of controlling a braking apparatus to apply brake force or controlling a notification device to output a notification.

2. The vehicle deceleration assistance apparatus as set forth in claim 1, wherein the electronic control unit is configured to execute the deceleration assistance control of a third level higher than the second level when (i) the first condition becomes satisfied while the second condition is satisfied, and (ii) a turning direction allowed for the vehicle is only a turning direction indicated by the activated blinkers.

3. The vehicle deceleration assistance apparatus as set forth in claim 1, wherein the electronic control unit is configured to execute the deceleration assistance control of a fourth level higher than the second level when (i) the blinkers becomes activated, and (ii) the first condition becomes satisfied after the target point distance becomes equal to or shorter than the predetermined distance.

4. The vehicle deceleration assistance apparatus as set forth in claim 1, wherein the electronic control unit is configured to execute the deceleration assistance control of the first level after the predetermined time elapses since the first condition becomes satisfied even when the first and second conditions are satisfied.

5. A vehicle deceleration assistance method of executing a deceleration assistance control to assist a deceleration of a vehicle before the vehicle arrives at a deceleration assistance target point where the vehicle is allowed to turn left or right, wherein the vehicle deceleration assistance method comprises steps of:
   obtaining surrounding detection information from at least one sensor;
   detecting the deceleration assistance target point based on the surrounding detection information;
   executing the deceleration assistance control of a first level as a deceleration assistance level of assisting the deceleration of the vehicle when a first condition is satisfied and a second condition is not satisfied,
   the first condition being a condition that a target point distance is equal to or shorter than a predetermined distance, and blinkers of the vehicle are activated,
   the target point distance being a distance between the vehicle and the deceleration assistance target point,
   the second condition being a condition that the blinkers activated for changing traffic lanes continue being activated; and
   executing the deceleration assistance control of a second level lower than the first level from a time when the second condition becomes satisfied until a predetermined time elapses from a time when the first condition becomes satisfied, wherein the deceleration assistance control is at least one of controlling a braking apparatus to apply brake force or controlling a notification device to output a notification.

6. A non-transitory computer-readable storage medium storing a vehicle deceleration assistance program which executes a deceleration assistance control to assist a deceleration of a vehicle before the vehicle arrives at a deceleration assistance target point where the vehicle is allowed to turn left or right, wherein the vehicle deceleration assistance program is configured to:
- obtain surrounding detection information from at least one sensor;
- detect the deceleration assistance target point based on the surrounding detection information;
- execute the deceleration assistance control of a first level as a deceleration assistance level of assisting the deceleration of the vehicle when a first condition is satisfied and a second condition is not satisfied,
  - the first condition being a condition that a target point distance is equal to or shorter than a predetermined distance, and blinkers of the vehicle are activated,
  - the target point distance being a distance between the vehicle and the deceleration assistance target point,
  - the second condition being a condition that the blinkers activated for changing traffic lanes continue being activated; and
- execute the deceleration assistance control of a second level lower than the first level from a time when the second condition becomes satisfied until a predetermined time elapses from a time when the first condition becomes satisfied, wherein the deceleration assistance control is at least one of controlling a braking apparatus to apply brake force or controlling a notification device to output a notification.

* * * * *